United States Patent
Fisk et al.

(10) Patent No.: US 9,942,385 B2
(45) Date of Patent: Apr. 10, 2018

(54) SYSTEM AND METHOD FOR PREVENTING AND/OR LIMITING USE OF A MOBILE DEVICE

(75) Inventors: Frank C. Fisk, Lawrenceville, GA (US); Sri Ramanathan, Lutz, FL (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 13/198,373

(22) Filed: Aug. 4, 2011

(65) Prior Publication Data
US 2013/0035063 A1 Feb. 7, 2013

(51) Int. Cl.
| | |
|---|---|
| *H04M 1/725* | (2006.01) |
| *H04L 29/06* | (2006.01) |
| *H04W 4/22* | (2009.01) |
| *H04W 4/02* | (2009.01) |

(Continued)

(52) U.S. Cl.
CPC ...... *H04M 1/72572* (2013.01); *H04L 63/107* (2013.01); *H04M 1/72577* (2013.01); *H04M 1/6075* (2013.01); *H04M 2250/04* (2013.01); *H04W 4/008* (2013.01); *H04W 4/02* (2013.01); *H04W 4/22* (2013.01)

(58) Field of Classification Search
CPC .............. H04K 3/415; H04K 2203/16; H04K 2203/22; H04W 88/02; H04W 4/02; H04W 88/06; H04W 4/12; H04W 4/008; H04W 4/22; H04L 29/08657; H04L 63/107; H04M 2250/00; H04M 1/6075; H04M 1/72572; H04M 1/72577; H04M 2250/04

USPC .......... 455/410–411, 414.1–414.2, 418–420, 455/456.1–456.6

See application file for complete search history.

(56) References Cited

U.S. PATENT DOCUMENTS

| | | |
|---|---|---|
| 7,355,506 B2 | 4/2008 | Chandley |
| 7,474,264 B2 | 1/2009 | Bolduc et al. |
| 7,856,203 B2 | 12/2010 | Lipovski |

(Continued)

FOREIGN PATENT DOCUMENTS

| | | |
|---|---|---|
| CN | 1604006 | 4/2005 |
| CN | 101878665 | 11/2010 |
| CN | 101888449 | 11/2010 |

OTHER PUBLICATIONS

Box, "New Data from VTTI Provides Insight into Cell Phone Use and Driving Distractions", VirginiaTech Transportation Institute, 4 pages.

(Continued)

*Primary Examiner* — Michael Mapa
(74) *Attorney, Agent, or Firm* — Christopher McLane; Andrew M. Calderon; Roberts Mlotkowski Safran Cole & Calderon, P.C.

(57) ABSTRACT

A system and a method for preventing and/or limiting use of mobile devices are provided. The method includes receiving, by a mobile device, a message indicating that the mobile device is in a certain location, and determining a user-configured security policy of the mobile device based on the certain location. The method further includes at least one of disabling and enabling, by the mobile device, one or more functions of the mobile device based on the determined user-configured security policy.

27 Claims, 6 Drawing Sheets

(51) Int. Cl.
*H04M 1/60* (2006.01)
*H04W 4/00* (2009.01)

(56) References Cited

U.S. PATENT DOCUMENTS

| | | | |
|---|---|---|---|
| 7,873,374 B1 | 1/2011 | O'Neil | |
| 8,065,079 B2 | 11/2011 | Rogers | |
| 8,069,479 B2 | 11/2011 | O'Neill | |
| 2003/0008662 A1* | 1/2003 | Stern | H04M 1/72572 455/456.1 |
| 2004/0210752 A1* | 10/2004 | Rao | G06F 8/65 713/2 |
| 2005/0055578 A1* | 3/2005 | Wright et al. | 713/201 |
| 2006/0224319 A1 | 10/2006 | Rogers | |
| 2008/0081643 A1* | 4/2008 | Nagata et al. | 455/456.6 |
| 2009/0205016 A1* | 8/2009 | Milas | 726/1 |
| 2009/0318169 A1* | 12/2009 | Rogitz | 455/456.4 |
| 2010/0017411 A1* | 1/2010 | Nakamura et al. | 707/9 |
| 2010/0210254 A1* | 8/2010 | Kelly et al. | 455/418 |
| 2010/0233959 A1* | 9/2010 | Kelly et al. | 455/41.2 |
| 2010/0317336 A1 | 12/2010 | Ferren et al. | |
| 2011/0021234 A1 | 1/2011 | Tibbitts et al. | |
| 2011/0105097 A1* | 5/2011 | Tadayon | H04M 3/53 455/418 |
| 2012/0244883 A1* | 9/2012 | Tibbitts | H04W 48/04 455/456.2 |

OTHER PUBLICATIONS

Bunkley, "Ford Backs Ban on Text Messaging by Drivers", The New York Times, Sep. 11, 2009, pp. 1-2.

IBM, "RFID services, Integrate real time data capture with key business processes using RFID", URL: http://www-935.ibm.com/services/us/en/it-services/rfid-services.html, 1 page.

IBM, "POSCO helps keep employees safe with real-time location monitoring", Published on Sep. 30, 2010, URL: http://www-01.ibm.com/software/success/cssbd.nsf/cs/JHUN-89SR4K?OpenDocument . . . , 5 pages.

* cited by examiner

SYSTEM AND METHOD FOR PREVENTING AND/OR LIMITING USE OF A MOBILE DEVICE

TECHNICAL FIELD

The present invention generally relates to mobile devices, and more particularly, to a system and a method for preventing and/or limiting use of mobile devices.

BACKGROUND

As mobile devices enable easier, faster communication among their users, occurrences of communicating during activities that require focused concentration (e.g., operating heavy equipment and driving an automobile) has increased. This has led to situations where the focus of a person is not on such an activity but on communicating on his or her mobile device. Examples of this include traffic accidents where drivers are texting using their mobile devices. Studies have shown that text messaging is significantly more dangerous than talking, on a mobile phone, while talking on a mobile phone is less dangerous than trying to make a phone call.

In response to such studies, many states, municipalities, etc. have established laws that prohibit people from using their mobile devices during certain activities, such as driving. However, these laws are difficult to enforce, resulting in a significant amount of drivers still operating their mobile devices while performing other activities, e.g., driving. Further, current technology does not adequately prohibit the use of mobile devices during other activities.

SUMMARY

In a first aspect of the invention, a method includes receiving, by a mobile device, a message indicating that the mobile device is in a certain location, and determining a user-configured security policy of the mobile device based on the certain location. The method further includes at least one of disabling and enabling, by the mobile device, one or more functions of the mobile device based on the determined user-configured security policy.

In another aspect of the invention, a system implemented in hardware, including a computer infrastructure operable to receive a message indicating that the computer infrastructure is in an area of a field created by a transmitter, the message including one or more attributes associated with the area. The computer infrastructure is further operable to determine a user-configured security profile of the computer infrastructure based on the received message, and at least one of disable and enable one or more functions of the computer infrastructure based on the determined user-configured security profile.

In an additional aspect of the invention, a computer program product including a computer usable storage medium having readable program code embodied in the medium is provided. The computer program product includes at least one component operable to receive a message indicating that a mobile device is in a certain location, and determine a user-configured security policy of the mobile device based on the certain location. The at least one component further operable to at least one of disable and enable one or more functions of the mobile device based on the determined user-configured security policy.

In another aspect of the invention, a method for preventing or limiting use of a mobile device, including providing a computer infrastructure operable to create a short range field detectable by the mobile device in an area of the short range field, and detect that the mobile device is in the area. The computer infrastructure is further operable to send a message to the mobile device indicating that the mobile device is in the area, to trigger a user-configured security profile of the mobile device that is used to at least one of disable and enable one or more functions of the mobile device.

In a further aspect of the invention, a computer system for preventing or limiting use of a mobile device, including a CPU, a computer readable memory and a computer readable storage media. First program instructions receive a message indicating that the computer system is in an area of a field created by a transmitter, the message including one or more attributes associated with the area. Second program instructions access a security manager to determine a user-configured security profile of the computer system based on the received message, the security manager including one or more user-configured security profiles of the computer system. Third program instructions at least one of disable and enable one or more functions of the computer system based on the determined user-configured security profile. The user-configured security profile includes at least one attribute associated with the area. The determining of the user-configured security profile includes matching the at least one attribute of the user-configured security profile to the one or more attributes of the message. The first, second and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to mobile devices, and more particularly, to a system and a method for preventing and/or limiting use of a mobile device during certain activities. More specifically, the present invention provides a mobile device (e.g., a mobile phone, a laptop, a video camera, etc) with one or more security profiles implemented by a security tool. The security profiles include the capability to prevent or limit the use of one or more functions of the mobile device (e.g., receiving and sending a mobile phone call) during certain activities (e.g., driving) or when detected to be in certain locations. The security profile can, for example, be enabled or disabled when the mobile device is in a specific location or area of influence (e.g., a passenger vehicle driver's seat).

In embodiments, the activation of the security profile is accomplished using secure transmissions between the mobile device and a transmitter, e.g., a radio-frequency identification (RFD) transmitter, which creates a short range field detectable by the mobile device in an area of influence (e.g., a passenger vehicle driver's seat). For example, the transmitter transmits a message to the mobile device that indicates that the mobile device is in the area of influence, which may trigger an associated security profile to enable or disable functions (e.g., receiving and sending a mobile phone call) of the mobile device. Advantageously, the present invention enables enforcement of functionality restrictions of a mobile device, which provides security and safety of its users while they are in areas requiring focus and concentration, e.g., a passenger vehicle driver's seat.

In embodiments, the present invention further provides a security manager, which manages one or more security profiles associated with various areas of influence. For example, a user may access the security manager to create, configure, and store one or more security profiles, and the mobile device may access the security manager to determine and load the one or more user-configured security profiles based on information received from a transmitter in a specific area of influence. The one or more security profiles may be password-protected, and/or may be managed by, e.g., a user of a mobile device and/or a third party, via the security manager. Advantageously, the present invention allows security profiles to be managed by only a responsible third party (e.g., a parent) to ensure the security and safety of users of a mobile device, and prevents the security profiles from being altered by non-authorized users.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or Mock diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
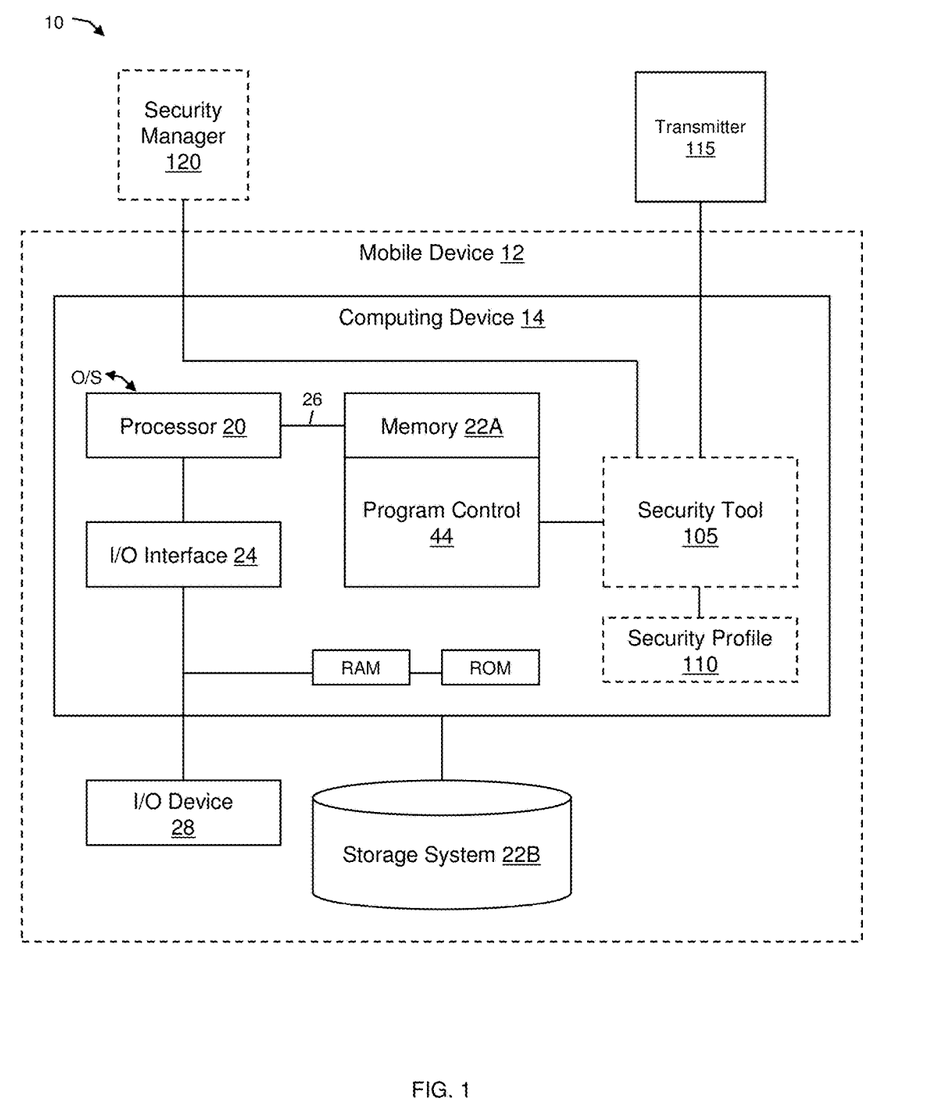
FIG. 1 shows an illustrative environment for implementing the steps in accordance with aspects of the invention.

FIG. 1 shows an illustrative environment 10 for managing the processes in accordance with the invention. To this extent, the environment 10 includes a mobile device or other computing system 12 that can perform the processes described herein. In embodiments, the mobile device 12 may include any mobile computing device, such as a mobile phone, a laptop, a video camera, etc. In particular, the mobile device 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handset, keyboard, etc.

In general, the processor 20 executes computer program code (e.g., program control 44), which can be stored in the memory 22A and/or storage system 22B. Moreover, in accordance with aspects of the invention, the program control 44 controls a security tool 105, e.g., the processes described herein. The security tool 105 can be implemented as one or more program code in the program control 44 stored in memory 22A as separate or combined modules. Additionally, the security tool 105 may be implemented as separate dedicated processors or a single or several processors to provide the function of this tool. Moreover, it should be understood by those of ordinary skill in the art that the security tool 105 is used as a general descriptive term for providing the features and/or functions of the present invention.

In embodiments, the security tool 105 enforces a security profile 110 on the mobile device 12. The security profile 110 will, for example, enable or disable functionality of the mobile device 12, under predefined circumstances or at predefined locations. More specifically, the enforcement of the security profile 110 is accomplished using secure transmissions between the security tool 105 and a transmitter 115. In embodiments, the transmitter 115 may include a radio-frequency identification (RFID) transmitter, a Bluetooth® transmitter, a near field communication (NFC) transmitter, and/or any other type of transmitter that creates a short range field (e.g., having a start and end within a certain predefined distance) detectable by the mobile device 12. (Bluetooth is a trademark of the Bluetooth Special Interest Group and registered in many jurisdictions worldwide.) In addition, the transmitter 115 may be located in various areas, e.g., a passenger vehicle, a movie theater, etc. The security profile 110 may include different profiles for limiting, preventing, or altering functionality of the mobile device 12 during certain activities or within certain locations, as discussed in more detail below.

In accordance with aspects of the invention, the transmitter 115 transmits a message to the security tool 105 indicating that the mobile device 12 is in a specific area of influence, which may trigger the security profile 110 to enable or disable functionality of the mobile device 12. For example, the transmitter 115 may transmit to the security tool 105 information or attributes associated with a certain location of the transmitter 115, such as a passenger vehicle driver's seat, a passenger vehicle front passenger seat, a passenger vehicle back seat, a movie theater, etc. Based on the attributes associated with the area, the security tool 105 may then determine and load a security profile (e.g., the security profile 110) associated with the area (e.g., with matching location attributes), and enforce functionality restrictions of that security profile, such as disable voice, disable Short Message Service (SMS), disable data, and/or disable other functions, of the mobile device 12.

For example, the transmitter 115 may be located in an area of influence of a passenger vehicle driver's seat, and when the mobile device 12 is detected to be within a short range field of the transmitter 115, the transmitter 115 may transmit to the security tool 105 attributes associated with the passenger vehicle driver's seat. Based on these attributes, the security tool 105 determines and loads a security profile (e.g., the security profile 110) associated with (e.g., including attributes of) the passenger vehicle driver's seat. Such a security profile may indicate disablement of certain functions of the mobile device 12, such as initiating a phone call, displaying incoming SMS messages, sending SMS messages, etc. The security tool 105 then enforces functionality restrictions of the loaded security profile while the mobile device 12 is located in the area of the passenger vehicle driver's seat.

In embodiments, a security manager 120 manages one or more security profiles including the security profile 110, associated with various areas and/or activities. For example, a user may access the security manager 120 to create, configure, and store the one or more security profiles, and the security tool 105 may access the security manager 120 to determine and load the user-configured one or more security profiles based on attributes associated with an area that are received from the transmitter 115. In embodiments, the security manager 120 may be located on the mobile device 12 and/or in a carrier network. In addition, the one or more security profiles may be password-protected, and/or may be managed by, e.g., an account holder and/or another third party, via the security manager 120. Advantageously, the present invention allows security profiles to be managed by only a responsible third party (e.g., a parent) to prevent the security profiles from being altered by a non-authorized user.

In accordance with further aspects of the invention, the transmitter 115 may transmit to the security tool 105 attributes of an area of influence that activate a security profile with less functionality restrictions. For example, the attributes of the area may indicate that the mobile device 12 has been moved from an area requiring focus and concentration (e.g., a passenger vehicle driver's seat) to another area which does not require focus and concentration (e.g., a passenger vehicle back seat). In this case, the security tool 105 may determine and load a security profile enabling additional functions, such as initiating a phone call and sending SMS messages.

In another example, the attributes of the area may include one or more "states" of the area. For example, states of a passenger vehicle driver's seat may include a velocity of the passenger vehicle, and/or an indication that an emergency situation has been detected, e.g., a passenger vehicle air bag has been deployed. In the cases where the velocity is zero and/or there is an emergency situation, the security tool 105 may determine and load a security profile which permits less functionality restrictions or reinstates certain functions, even though the mobile device 12 may be located in the passenger vehicle driver's seat.

Table 1 below describes various examples of user-configured security profiles, their areas of influence (e.g., locations) and states, and their associated functions in the areas of influence and states.

TABLE 1

| Where is mobile device | Transmitter in area of influence | Mobile device functions disabled | Mobile device functions enabled |
|---|---|---|---|
| Outside area of influence | No action | None | Electronic book (e-book), texting, phone, 911, browser, global positioning system (GPS) |
| Inside area of influence (first time entering area) | 1) Send attributes of area of influence 2) Begin sending states of area | None | e-Book, texting, phone, 911, browser, GPS |
| Inside area of influence (state: velocity is zero) | Send state of area of influence | e-Book, texting, browser | Phone, 911, GPS |
| Inside area of influence (state: velocity is not zero) | Send state of area of influence | e-Book, texting, phone, browser, GPS | 911 |
| Inside area of influence (state: emergency) | Send state of area of influence (emergency) | None | e-Book, texting, phone, 911, browser, GPS |
| Outside area of influence (leaving area) | 1) Recognize that mobile device has left area of influence 2) Go into 'no action' state | None. | e-Book, texting, phone, 911, browser, GPS |

Advantageously, the present invention enables predetermined and flexible controls (e.g., restrictions) to be applied to a user of a mobile device based on user-engaged activities (e.g., functions) and/or locations of the user. For example, the present invention allows parents to disable mobile device functions deemed inappropriate by the parents while their child is, e.g., driving an automobile and/or operating a motored vehicle. In another example, the system of the present invention enables trucking or shipping companies to load a "driving safety profile" onto company-provided mobile devices, or as a condition of employment, onto employees' personal mobile devices. This profile may enforce the companies' policies on restricting mobile device user while driving.

In embodiments, the present invention can also allow law enforcement personal to restrict use of a mobile device during certain activities of a user, as a condition of probation, other violations, etc. For example, when a user has a history of reckless behavior, e.g., when the user has a violation of a car accident linked to dialing or texting while driving, the resolution of the violation may include a security profile disable mobile device use in a vehicle. The present invention may further provide a limited-use device, or one that is rented at, e.g., a conference, and works only at the conference and/or conference-related areas, e.g., hotels. In this case, a security profile of the limited-use device does not limit functionality but rather enables functionality above what is defined in a default profile when the device is used at the conference or other designated locations.

In accordance with further aspects of the invention, the present invention allows a mobile device to function only when a portable transmitter (e.g., the transmitter 115) and the mobile device (e.g., the mobile device 12) are in a same area. For example, the portable transmitter may be embedded in an easily-carried fob-like accessory, such as a key fob on a key ring, a clip on a belt, a necklace pendent, etc. In this case, a user carrying the portable transmitter will be provided full functionality of the mobile device. Thus, if the mobile device is separated from the portable transmitter (e.g., is stolen), the mobile device will not fully work. Advantageously, the present invention may prevent stolen mobile devices and their potentially secret content and files from being accessed.

In other non-limiting, illustrative examples, the present invention may include a mobile device containing a profile that disables the mobile device's camera when in "no photo areas", such as an art museum and/or a military base. The present invention may also include a transmitter (e.g., the transmitter 115) on an airplane that may indicate, to mobile devices, states of the airplane (e.g., "taxi out", "takeoff", "in flight", "landing", and "taxi in"). In this case, security profiles on the mobile devices may, for example, disable transmissions of the mobile devices if a user has the mobile devices powered on during "taxi out", "takeoff", and/or "landing". These security profiles may further, for example, enable transmissions of the mobile devices during "in flight" and "taxi in". In embodiments, security profiles may be configured to be mutually exclusive. That is, a mobile device may load two different security profiles at a same time and only enable functionalities allowed in both profiles.

While executing the computer program code, the processor 20 can read and/or write data to/from memory 22A, storage system 22B, and/or I/O interface 24. The program code executes the processes of the invention, for example, functions of the security tool 105. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the mobile device 12 is only illustrative of various types of computer infrastructures for implementing the invention. For example, in embodiments, the mobile device 12 comprises two or more computing devices (e.g., a server cluster) that communicate over any type of communications link, such as a network, a shared memory, or the like, to perform the process described herein. Further, while performing the processes described herein, one or more computing devices on the mobile device 12 can communicate with one or more other computing devices external to the mobile device 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
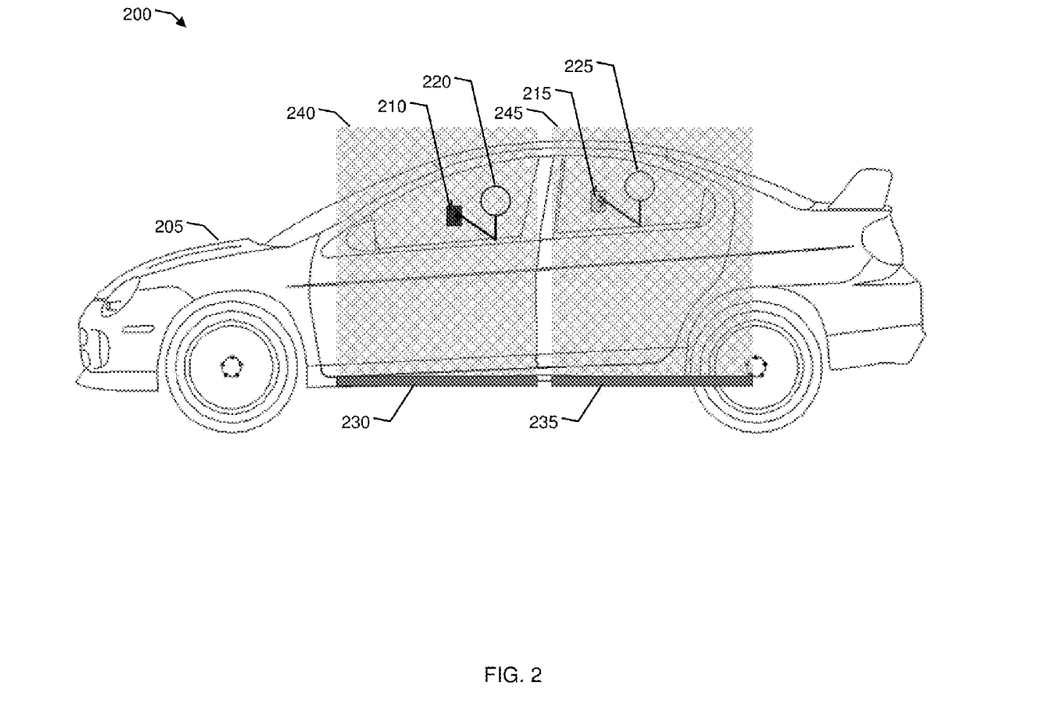
FIG. 2 shows another illustrative environment for implementing the steps in accordance with aspects of the invention.

FIG. 2 shows an illustrative environment 200 for managing the processes in accordance with the invention. The environment 200 includes a passenger vehicle 205 that, in embodiments, may include any type of automobile, such as a car, a truck, etc. In the passenger vehicle 205, there are two mobile devices 210 and 215 (e.g., mobile phones), which may be used by two persons 220 and 225, respectively. More specifically, the mobile device 210 may be used by the person 220 in an area of a passenger vehicle driver's seat, while the mobile device 215 may be used by the person 225 in an area of a passenger vehicle back seat. The passenger vehicle 205 includes transmitters 230 and 235 creating short range fields 240 and 245, respectively. In particular, the transmitter 230 creates the short range field 240 in or around the passenger vehicle driver's seat, and the transmitter 235 creates the short range field 245 in or around the passenger vehicle back seat. In embodiments, the transmitters 230, 235 may include radio-frequency identification (RFID) transmitters, Bluetooth® transmitters, near field communication (NFC) transmitters, and/or any other type of transmitters that creates short range fields detectable by mobile devices.

In embodiments, a parent may want to restrict his or her child's mobile device use while in the passenger vehicle 205. To do so, the parent may access the mobile device's security manager (e.g., the security manager 120 in FIG. 1) directly on the mobile device 210 or through a website, acting as an account holder of the security manager with proper permissions. In the security manager, the parent may create and save a security profile (e.g., the security profile 110) called "While Driving a Car" and may indicate attributes associated with locations or areas of influence that activate the security profile, to include a driver seat of the passenger vehicle 205 and a front passenger seat of the passenger vehicle 205. The created security profile may further include enable or disable functionalities of the mobile device as shown in Table 2.

TABLE 2

| Display incoming calls | Enable |
| Allow answer of white (user-defined) list calls | Enable |
| Allow answer of non-white list calls | Disable |
| Initiate call to emergency list (911) | Enable |
| Initiate call to white list | Enable |
| Initiate call to non-white list | Disable |
| Display incoming SMS messages | Disable |

TABLE 2-continued

| Send SMS messages | Disable |
| Data transmission | Disable |

In accordance with further aspects of the invention, the child's mobile device 210 continues to fully function until he or she enters the passenger vehicle 205 in the driver's seat, specifically, until the mobile device 210 enters the short range field 240 created by the transmitter 230. When the transmitter 230 detects that the mobile device 210 enters the short range field 240, the transmitter 230 transmits to the mobile device 210 a message indicating that the mobile device 210 has entered a specific area of influence, namely, the driver's seat of the passenger vehicle 205. In embodiments, the message may include attributes and/or states of the area, such as a velocity of the passenger vehicle 205 and/or an indication whether an emergency situation (e.g., a passenger vehicle accident) has been detected. Based on the message, the mobile device 210 determines and loads the security profile "While Driving a Car" from the security manager, and enforces the security profile. In other words, based on the loaded security profile "While Driving a Car", the mobile device 210 disables, for example, displaying of incoming SMS messages and sending SMS messages, as indicated above in Table 2. Advantageously, the mobile device 210 enforces functionality restrictions on itself to ensure the security of the person 220, while driving the passenger vehicle 205.

In embodiments, the security profile "While Driving a Car" is not applied to the mobile device 215, which may be operated by the person 225 in or around the back seat of the passenger vehicle 205. This is because the mobile device 215 is not within the short range field 240 created by the transmitter 230, but is within the short range field 245 created by the transmitter 235. Further, the security profile "While Driving a Car" may be removed from the mobile device 210 if the person 220, e.g., unable to make a call to a friend while driving, hands the mobile device 210 to the person 225 in the back seat. In this case, the mobile device 210 enters the short range field 245, and the transmitter 235 detects this and transmits to the mobile device 210 a message indicating that the mobile device 210 has entered a new area of influence, specifically, the back seat. Since the security profile "While Driving a Car" does not include the area of the back seat, the mobile device 210 determines and loads a default profile from the security manager that restores functionalities of the mobile device to normal. If the authorized users, e.g., the parent, so chooses, he or she may add the area of the back seat to the created security profile to restrict mobile phone use anywhere in the passenger vehicle 205.

In accordance with further aspects of the invention, the parent or user may create various security profiles for each location or areas of influence in the passenger vehicle. For example, the user may create various security profiles for each of the mobile devices 210, 215 that may be operated by different members of a family, e.g., the person 220 may be another parent of the family and thus, a security profile of the mobile device 210 may not restrict functionality. Further, the user may create various security profiles, and each of these profiles may include a high, medium, low, or default level of security. The user may then choose locations of the passenger vehicle 205 for which each of the different-level security profiles is applied.

FIGS. 3-6 show exemplary flows for performing aspects of the present invention. The steps of FIGS. 3-6 may be implemented in the environments of FIGS. 1-2, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 3:
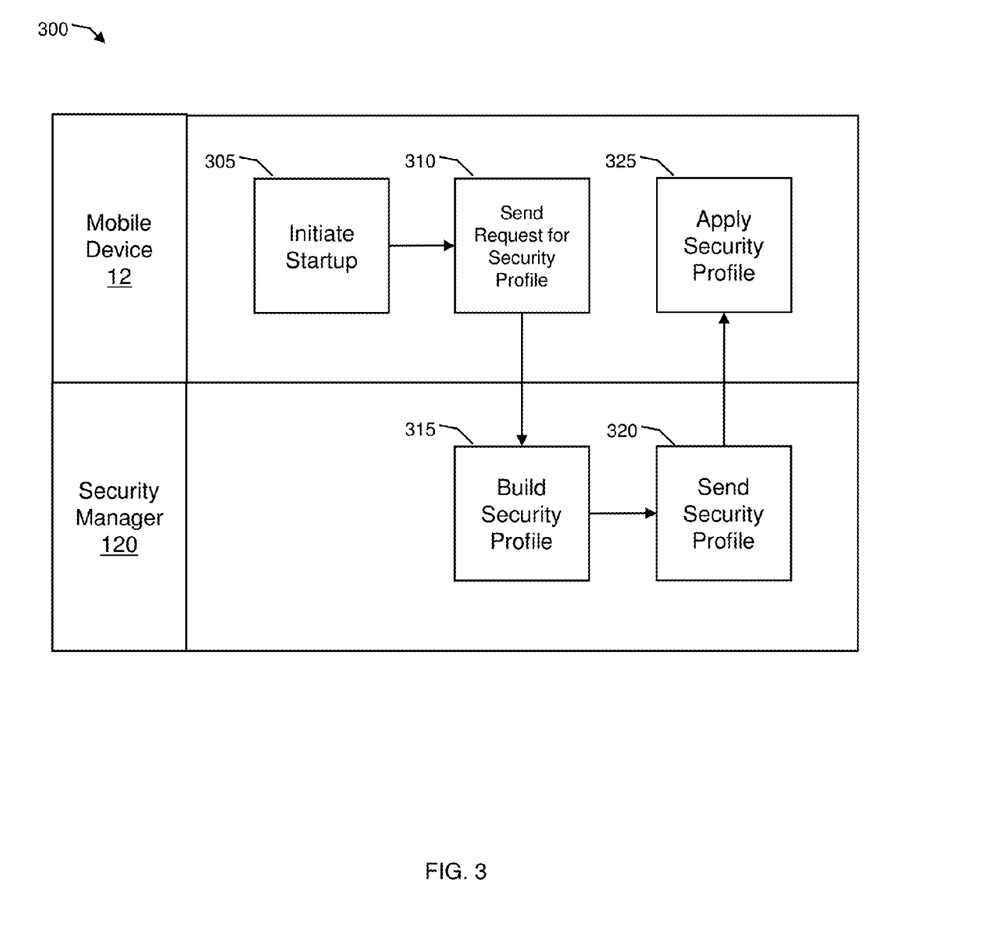
FIGS. 3-6 show exemplary flows in accordance with aspects of the invention.

FIG. 3 depicts an exemplary flow for a process 300 in accordance with aspects of the present invention. The process 300 involves two players: the mobile device 12 (via the security tool 105) and the security manager 120, in FIG. 1. The process 300 is performed when the mobile device 12 is starting up, to setup the mobile device 12 with an initial security profile, which includes functions (e.g., receiving and sending short message service (SMS) messages) of the mobile device 12 and whether they are enabled or disabled. In embodiments, the security manager 120 may be located wholly or partly in a carrier network and synced to the mobile device 12, and/or may reside locally on the mobile device 12, e.g., via an application download. At step 305, the process starts, and the mobile device 12 initiates startup of the mobile device 12. In embodiments, the startup may be initiated when an on button of the mobile device 12 is pressed.

At step 310, the mobile device 12 sends to the security manager 120 a request for the initial security profile, e.g., the security profile 110 in FIG. 1. In embodiments, the initial security profile may indicate to the mobile device 12 that all of its functions are enabled, and may be configured by a user of the mobile device 12 and/or a third party, via an Internet web browser and/or directly on the mobile device 12 itself. In addition, the sending of the request may include establishing a secure channel between the mobile device 12 and the security manager 120. Moreover, the sending of the request may be performed at a certain time of day.

At step 315, the security manager 120 builds or determines the requested initial security profile of the mobile device 12, from a repository of security profiles in the security manager 120. In embodiments, the building of the initial security profile may include establishing a session for the mobile device 12. At step 320, the security manager 120 sends to the mobile device 12 the built initial security profile. At step 325, the mobile device 12 applies the initial security profile by enabling or disabling the functions of the mobile device 12, as indicated in the initial security profile. At step 325, the process ends.

Figure 4:
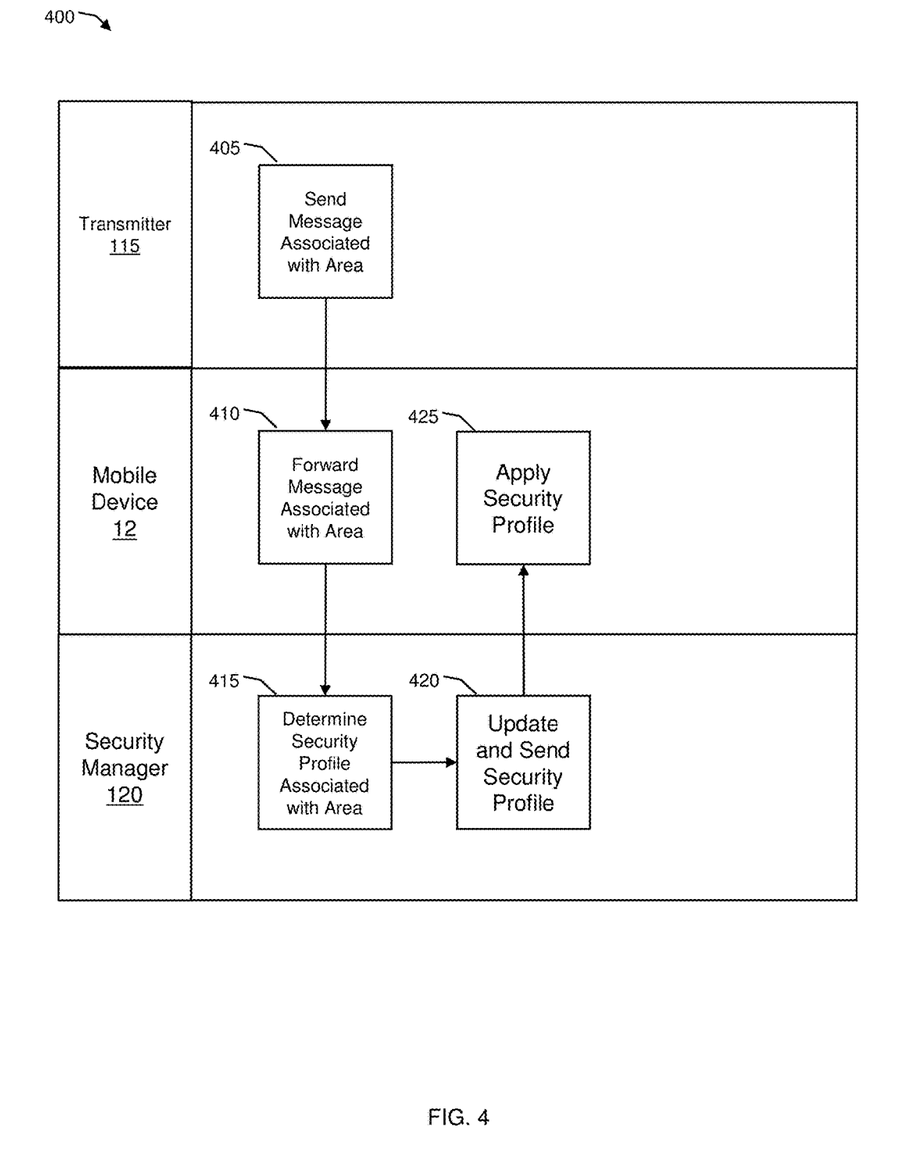

FIG. 4 depicts an exemplary flow for a process 400 in accordance with aspects of the present invention. The process 400 involves three players: the transmitter 115, the mobile device 12 (via the security tool 105), and the security manager 120, in FIG. 1. The process 400 is performed when the mobile device 12 enters a short field range created by the transmitter 115. At step 405, the process starts, and the transmitter 115 sends to the mobile device 12 a message associated with an area of influence of the short field range entered upon by the mobile device 12. In embodiments, the message associated with the area may include information or attributes associated with the area, such as a description of the area (e.g., a passenger vehicle driver's seat) and/or a state of the area (e.g., a velocity of the passenger vehicle). In addition, the sending of the message may include establishing a secure channel between the transmitter 115 and the mobile device 12.

At step 410, the mobile device 12 forwards to the security manager 120 the message associated with the area. At step 415, the security manager 120 determines and loads a security profile associated with the area based on the message and its attributes. In embodiments, the determining of the security profile may include determining or looking up the security profile with attributes associated with a certain area that match the attributes associated with the area. For example, if the attributes associated with the area indicate that the mobile device 12 has entered a passenger vehicle driver's seat, then the security manager 120 may locate and apply a security profile with attributes associated with the passenger vehicle driver's seat that disables, for example, receiving and sending SMS messages. If the message from the transmitter 115 is not transmitted to the security manager 120, then the security manager 120 applies a default profile (e.g., the initial security profile) to the mobile device 12.

At step 420, the security manager 120 updates and sends to the mobile device 12 a current security profile based on the determined security profile associated with the area. In embodiments, the updating of the current security profile may include applying or setting the determined security profile associated with the area to the mobile device 12 and/or updating the current security profile of the mobile device 12 with at least one attribute of the determined security profile. At step 425, the mobile device 12 applies the current security profile by enabling or disabling the functions of the mobile device 12, as indicated in the determined security profile. At step 425, the process ends. Advantageously, when the mobile device 12 enters a short field range or area of influence, the present invention provides a change to a security profile of the mobile device 12 without user intervention after the security profile associated with the area is in place and a message from a transmitter is received.

Figure 5:
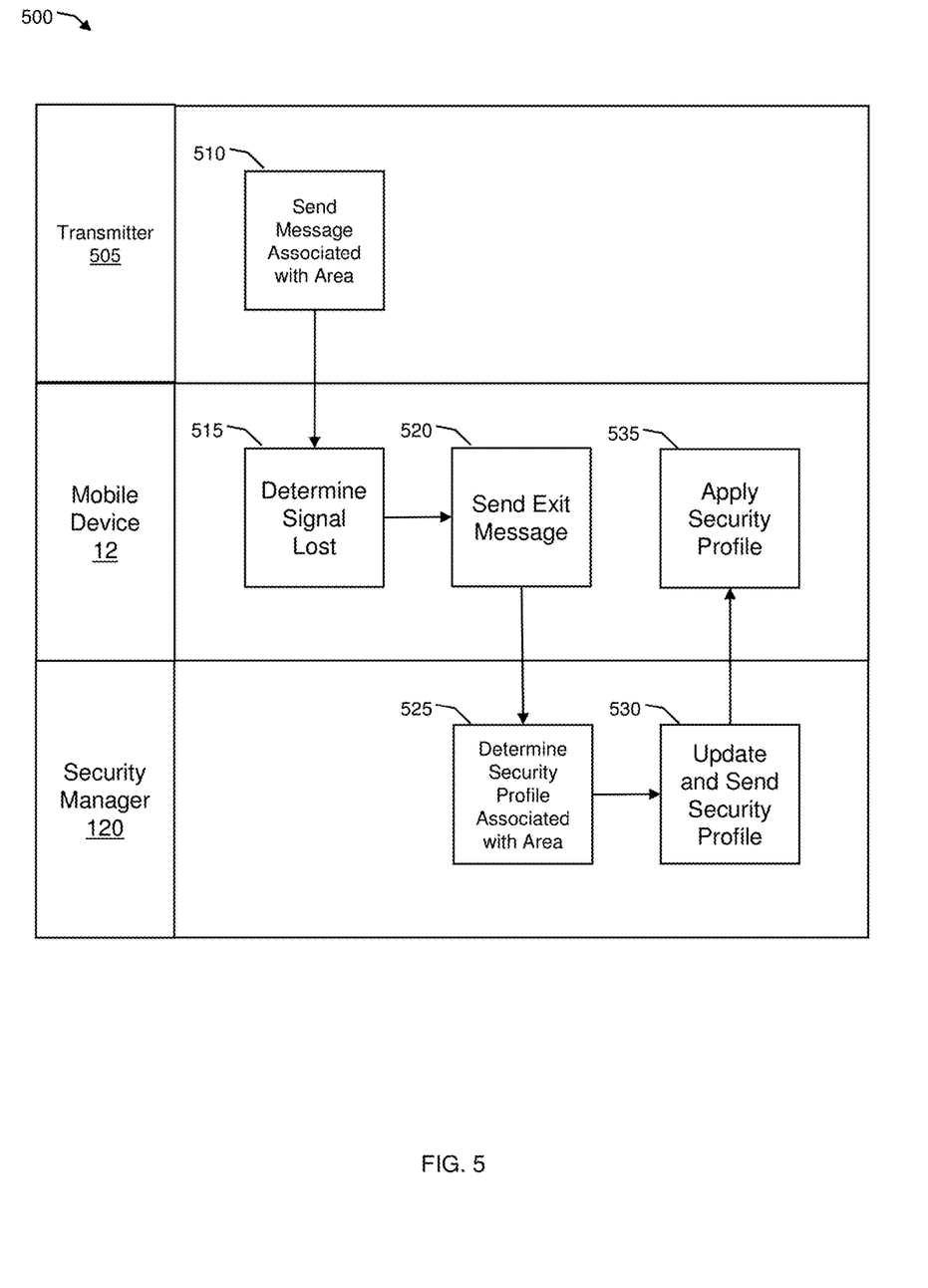

FIG. 5 depicts an exemplary flow for a process 500 in accordance with aspects of the present invention. The process 500 involves three players: the mobile device 12 (via the security tool 105) and the security manager 120, in FIG. 1. The process 500 also involves a transmitter 505. The process 500 is performed when the mobile device 12 exits a short field range created by the transmitter 115. At step 510, the process starts, and the transmitter 505 sends to the mobile device 12 a message associated with a new area of influence of a short field range entered upon by the mobile device 12 and created by the transmitter 505. In embodiments, the message associated with one of the areas may include information or attributes associated with the new area, such as a description of the new area (e.g., a passenger vehicle back seat) and/or a state of the new area (e.g., a velocity of the passenger vehicle). In addition, the sending of the message may include establishing a secure channel between the transmitter 505 and the mobile device 12.

At step 515, based on the message associated the new area, the mobile device 12 determines that a signal between the transmitter 115 and the mobile device 12 is lost. At step 520, the mobile device 12 sends to the security manager 120 an exit message indicating that the mobile device 12 has exited the previous area or short field range created by the transmitter 115. At step 525, the security manager 120 determines and loads a security profile associated with the previous area of the transmitter 115 based on the message and its attributes. In embodiments, the determining of the security profile may include determining or looking up the security profile with attributes associated with a certain area that match the attributes associated with the previous area of the transmitter 115. For example, if the attributes associated with the area indicate that the mobile device 12 has exited a passenger vehicle driver's seat, then the security manager 120 may locate a security profile with attributes associated with the passenger vehicle driver's seat.

At step 530, the security manager 120 updates and sends to the mobile device 12 the current security profile. In embodiments, the updating of the current security profile includes removing the determined security profile associated with the area of the transmitter 115 from the current security profile of the mobile device 12. For example, the security manager 120 may remove the located security profile for the passenger vehicle driver's seat from the current security profile. At step 535, the mobile device 12 applies the current security profile by enabling or disabling the functions of the mobile device 12, as indicated in the current security profile. At step 535, the process ends.

Figure 6:
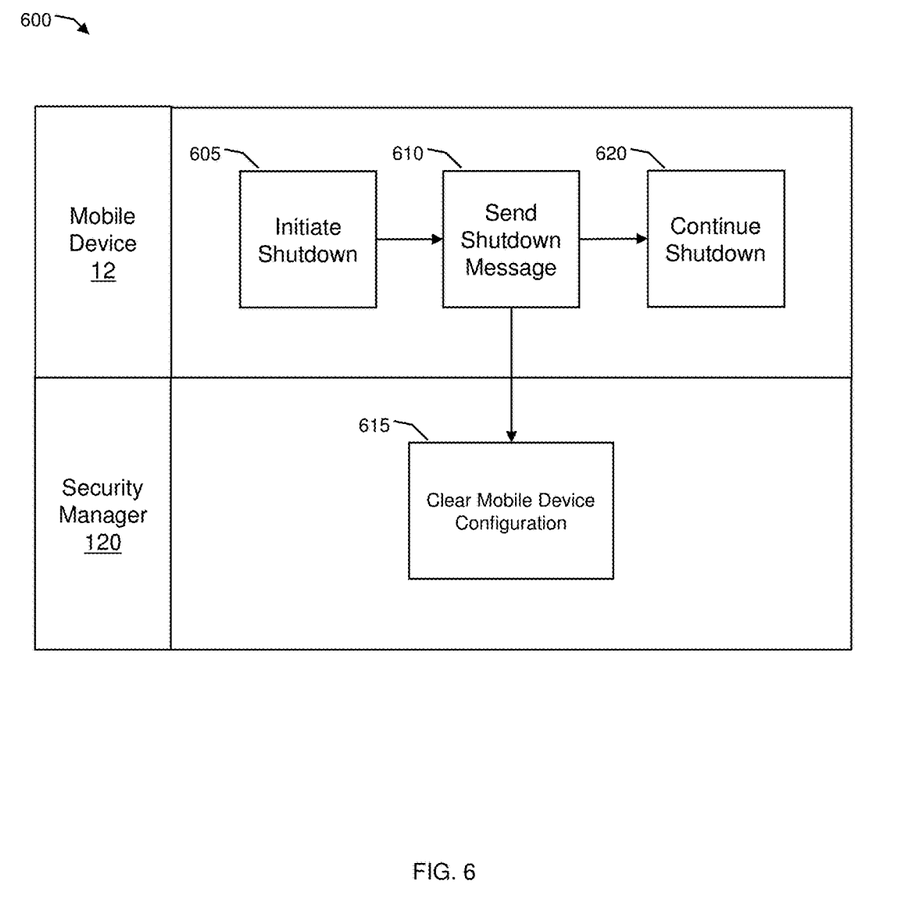

FIG. 6 depicts an exemplary flow for a process 600 in accordance with aspects of the present invention. The process 600 involves two players: the mobile device 12 (via the security tool 105) and the security manager 120, in FIG. 1. The process 600 is performed when the mobile device 12 is shutting down, to clear the mobile device 12 of its security profile, which includes functions (e.g., receiving and sending short message service (SMS) messages) of the mobile device 12 and whether they are enabled or disabled. At step 605, the process starts, and the mobile device 12 initiates shutdown of the mobile device 12. In embodiments, the shutdown may be initiated when an off button of the mobile device 12 is pressed.

At step 610, the mobile device 12 sends to the security manager 120 a shutdown message indicating that the mobile device 12 is in the process of shutting down. At step 615, the security manager 120 clears a configuration of the mobile device 12 that includes a security profile of the mobile device 12. In embodiments, the clearing of the configuration may include clearing or resetting the security profile of the mobile device 12, and/or clearing or resetting all configuration settings of the mobile device 12 to default states based on needs of the mobile device 12 when it powers on again. For example, the security profile of the mobile device 12 may be reset to a default profile in which all of functions of the mobile device 12 are enabled. At step 620, the mobile device 12 continues its shutdown process, and the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
   receiving, by a user's mobile device, a message from a transmitter indicating that the user's mobile device is in a certain location within one of a plurality of short range fields, wherein the message includes both location attribute information and a state of events currently occurring at the certain location, and the location attribute information describes attributes associated with the one of the plurality of short range fields;
   forwarding the message, by the user's mobile device, including both the location attribute information and the state of events, to a remote security manager located on a mobile device carrier network;

loading, by the user's mobile device, a third party-configured security profile from a plurality of saved security profiles associated with the user's mobile device, wherein the saved security profiles each include a high, medium and low default level of security, and the third party-configured security profile is selected and sent by the remote security manager based on the location attribute information and the state of events, the third party-configured security profile including one or more functionalities for disabling one or more functions of the user's mobile device;

disabling, by the user's mobile device, the one or more functions of the user's mobile device based on the third party-configured security profile;

sending, by the user's mobile device, a shutdown message to the remote security manager indicating that the user's mobile device is in the process of shutting down; and resetting, by the user's mobile device, all configuration settings of the user's mobile device, including the third party-configured security profile, to a default profile enabling all functions of the user's mobile device based on the shutdown message, wherein the state of events currently occurring includes a velocity of a vehicle and an indication of whether an emergency has been currently detected at the certain location.

2. The method of claim 1, wherein the third party-configured security profile comprises:
at least one event associated with the certain location;
the one or more functionalities of the user's mobile device; and
an indication whether each of the one or more functions is to be disabled or enabled when the user's mobile device is in the certain location associated with the location attribute information and the event is occurring.

3. The method of claim 1, wherein the certain location is an area of the one of the plurality of short range fields of the transmitter comprising at least one of:
a radio-frequency identification (RFID) transmitter; and
a near field communication (NFC) transmitter.

4. The method of claim 3, wherein the transmitter is configured to create the one of the plurality of short range fields detectable by the user's mobile device.

5. The method of claim 1, further comprising accessing the security manager to determine the third party-configured security profile, the security manager comprising one or more third party-configured security profiles of the user's mobile device.

6. The method of claim 5, wherein the one or more third party-configured security profiles are at least one of:
password-protected; and
managed by a third party via the security manager.

7. The method of claim 5, wherein the third party-configured security profile is updated on the user's mobile device during start up of the user's mobile device, and upon entering or exiting any of the plurality of short range fields.

8. The method of claim 5, wherein the third party-configured security profile is saved on the user's mobile device and remains active until the selected third party-configured security profile is received and replaces the third party-configured security profile.

9. The method of claim 1, wherein:
the third party-configured security profile comprises at least one event associated with the location attribute information; and
the selecting of the third party-configured security profile comprises matching the at least one event of the third party-configured security profile to the state of events currently occurring from the message.

10. The method of claim 1, further comprising:
sending a request for an initial third party-configured security profile of the mobile device at a startup of the mobile device.

11. The method of claim 1, wherein the selecting of the third party-configured security profile comprises determining one or more third party-configured security profile comprising at least one event associated with at least one of the location attribute information and a previous location attribute information.

12. The method of claim 1, wherein a service provider at least one of creates, maintains, deploys, and supports a computer infrastructure configured to the steps of claim 1.

13. The method of claim 1, wherein the steps of claim 1 are provided by a service provider on a subscription, advertising, and/or fee basis.

14. The method of claim 1, wherein:
the selecting the third party-configured security profile comprises determining the third party-configured security profile with events that match the state of events currently occurring at the certain location; and
the state of events include at least one user-engaged activity currently occurring at the certain location.

15. The method of claim 14, wherein:
the selecting the third party-configured security profile is performed on the security manager; and
the events of the third party-configured security profile are defined by a third party.

16. The method of claim 1, wherein the emergency being currently detected at the current location comprises a vehicle accident being currently detected at the current location.

17. The method of claim 16, wherein the vehicle accident being currently detected at the current location comprises detecting that a vehicle air bag has been deployed at the current location.

18. A method of deploying a system for preventing or limiting use of a mobile device, comprising:
providing a computer infrastructure configured to:
create a plurality of short range fields detectable by the mobile device in an area of at least one of the plurality of short range fields;
detect that the mobile device is in the area; and
send a message to the mobile device indicating that the mobile device is in the area, attribute information about the area, and a state of events that are currently occurring within the area, to trigger a user-configured security profile of the mobile device selected based on the area, the attribute information and the state of events, wherein the attribute information describes attributes associated with the one of the plurality of short range fields, and the selected user-configured security profile is used to at least one of disable and enable one or more functions of the mobile device, wherein the user-configured security policy is located on the mobile device; and
providing a security manager configured to:
receive the message, including both the attribute information and the state of events from the mobile device;
determine a new user-configured security profile to be sent to the mobile device based on the attribute information and the state of events;

send the new user-configured security profile to the mobile device;

send a shutdown message to the remote security manager indicating that the mobile device is in the process of shutting down; and reset all configuration settings of the mobile device, including the received user-configured security policy, to a default profile enabling all functions of the mobile device based on the shutdown message, wherein the security manager is on a mobile device carrier network, wherein the state of events currently occurring includes a velocity of a vehicle and an indication of whether an emergency has been currently detected at the certain location.

19. The method of claim 18, wherein the computer infrastructure comprises at least one of:
a radio-frequency identification (RFID) transmitter; and
a near field communication (NFC) transmitter.

20. A computer system for preventing or limiting use of a mobile device, comprising:
a CPU, a computer readable memory and a computer readable storage media;
program instructions to receive a message from a transmitter indicating that the mobile device is in an area of one of a plurality of fields created by one of a plurality of transmitters, the message including both location attribute information associated with the area and a state of events currently occurring in the area, and the location attribute information describes attributes associated with the one of the plurality of fields;
program instructions to forward the message, including both the location attribute information and the state of events to a security manager located on a network;
program instructions to access the security manager to obtain, by the mobile device, a user-configured security profile determined by the security manager based on the location attribute information and the state of events, the security manager comprising one or more user-configured security profiles of the mobile device;
program instructions to change a present user-configured security profile on the mobile device to the obtained user-configured security profiles; and
program instructions to at least one of disable and enable one or more functions of the computer system based on the determined user-configured security profile set for the attributes associated with the one of the plurality of fields,
wherein:
the obtained user-configured security profile comprises at least one event associated with the area;
the determining of the user-configured security profile by the security manager comprises matching the at least one event of the user-configured security profile to the state of events currently occurring from the message;
the obtained user-configured security profile includes one or more functionalities for the at least one of disabling and enabling the one or more functions of the mobile device;
the present user-configured security profile is updated on the mobile device during start up of the mobile device and upon entering or exiting any of the plurality of fields;
the present user-configured security profile is saved on the mobile device and remains active until the obtained user-configured security profile is received and replaces the present user-configured security profile; and
the program instructions are stored on the computer readable storage media for execution by the CPU via the computer readable memory, and
program instructions to send a shutdown message to the security manager indicating that the mobile device is in the process of shutting down; and
program instructions to reset all configuration setting of the user's mobile device, including the present user-configured security profile, to a default profile enabling all functions of the user's mobile device based on the shutdown message;
wherein the state of events currently occurring includes a velocity of a vehicle and an indication of whether an emergency has been currently detected at the certain location.

21. The computer system of claim 20, wherein the obtained user-configured security profile further comprises:
one or more functions of the mobile device; and
an indication whether each of the functionalities is to be disabled or enabled when at least one of the mobile device is in the area and the at least one event of the user-configured security profile matches the state of events currently occurring from the message.

22. A system implemented in hardware, comprising:
a computer infrastructure configured to:
receive a first message from a first transmitter indicating that the computer infrastructure is in a first area within a field created by the first transmitter, wherein the message includes location attribute information regarding the first area;
forward the first message, including the location attribute information, to a remote security manager located on a mobile device carrier network;
load a first user-configured security profile selected and sent by the remote security manager based on the location attribute information in the first message, the first user-configured security profile including one or more functionalities for at least one of disabling and enabling one or more functions of the computer infrastructure;
receive a message from a second transmitter indicating that the computer infrastructure is in a second area within a field created by the second transmitter, wherein the message includes location attribute information regarding the second area;
forward the second message, including the location attribute information, to the remote security manager located on the mobile device carrier network;
load a second user-configured security profile selected and sent by the remote security manager based on the location attribute information in the second message, the second user-configured security profile including one or more functionalities for the at least one of disabling and enabling the one or more functions of the computer infrastructure;
at least one of disable and enable one or more functions of the computer infrastructure based on only functionality allowed in both the first user-configured security profile and the second user-configured security profile;
send a shutdown message to the remote security manager indicating that the computer infrastructure is in the process of shutting down; and reset all configuration settings of the computer infrastructure to a default profile enabling all functions of the computer infrastructure based on the shutdown message.

23. The system of claim 22, wherein the first user-configured security profile comprises:
at least one event associated with the first area;
one or more functionalities of the computer infrastructure; and
an indication whether each of the functions is to be disabled or enabled when the computer infrastructure is in the first area and the at least one event of the first user-configured security profile matches the status of the one or more events currently occurring from the message.

24. The system of claim 22, wherein the computer infrastructure is further configured to access the security manager to determine the first user-configured security profile and the second user-configured security profile.

25. The system of claim 22, wherein:
the first user-configured security profile comprises at least one event associated with the first area; and
the selecting of the first user-configured security profile comprises matching the at least one event of the first user-configured security profile to the status of the one or more events currently occurring from the first message.

26. A computer program product comprising a computer usable storage memory or device having readable program code embodied in the storage memory or device, the computer program product includes at least one component configured to:
request an initial user-configured security policy of a mobile device at a startup of the mobile device from a remote security manager on a mobile device carrier network;
receive from the remote security manager the initial user-configured security policy;
store the initial user-configured security policy as a current user-configured security policy on the mobile device;
receive a message indicating that the mobile device is in a certain location within one of a plurality of short range fields, wherein the message is received from one of a plurality of transmitters positioned at the certain location and the message includes both location attribute information and a state of events currently occurring at the certain location, and the location attribute information describes attributes associated with the one of the plurality of short range fields;
forward the message, including both the location attribute information and the state of events to the remote security manager;
receive, by the mobile device, a user-configured security policy selected from a plurality of saved security profiles each include a high, medium and low default level of security, and sent by the remote security manager based on the location attribute information and the state of events;
update the current user-configured security policy on the mobile device based on the received user-configured security policy;
at least one of disable and enable one or more functions of the mobile device based on only enable functionalities allowed in both the current user-configured security policy and the received user-configured security policy for the attributes associated with the one of the plurality of short range fields,
send a shutdown message to the remote security manager indicating that the mobile device is in the process of shutting down; and
reset all configuration settings of the mobile device, including the received user-configured security policy, to a default profile enabling all functions of the mobile device based on the shutdown message,
wherein:
the received user-configured security policy includes one or more functionalities for the at least one of disabling and enabling the one or more function of the mobile device; and
wherein the state of events currently occurring includes a velocity of a vehicle and an indication of whether an emergency has been currently detected at the certain location.

27. The computer program product of claim 26, wherein the user-configured security policy comprises:
at least one event associated with the certain location;
the one or more functionalities of the mobile device; and
an indication whether each of the one or more functions is to be disabled or enabled when the mobile device is in the certain location associated with the location attribute information and the event is occurring.

* * * * *